(12) United States Patent
Holtmann et al.

(10) Patent No.: US 9,149,001 B2
(45) Date of Patent: Oct. 6, 2015

(54) THRESHING MECHANISM WITH SWIVELLABLE CONCAVES

(71) Applicant: CLAAS SELBSTFAHRENDE ERNTEMASCHINEN GMBH, Harsewinkel (DE)

(72) Inventors: Bernd Holtmann, Sendenhorst (DE); Dirk Esken, Soest-Meckingsen (DE); Manfred Krieft, Harsewinkel (DE); Franz Buddenkotte, Harsewinkel (DE); Ralf Bussmann, Sassenberg (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 41 days.

(21) Appl. No.: 14/147,765

(22) Filed: Jan. 6, 2014

(65) Prior Publication Data
US 2014/0194170 A1    Jul. 10, 2014

(30) Foreign Application Priority Data
Jan. 4, 2013 (DE) .................. 10 2013 100 057

(51) Int. Cl.
*A01F 12/28* (2006.01)
*A01F 12/26* (2006.01)

(52) U.S. Cl.
CPC .................. *A01F 12/28* (2013.01); *A01F 12/26* (2013.01)

(58) Field of Classification Search
CPC ... A01F 12/442; A01F 12/444; A01F 12/446; A01F 12/44; A01F 12/26; A01F 2012/188; A01F 12/18; A01F 12/28; A01F 12/181
USPC .......... 460/75, 62, 73, 109, 108, 107; 56/14.6
See application file for complete search history.

(56) References Cited

U.S. PATENT DOCUMENTS

| | | | | |
|---|---|---|---|---|
| 897,030 | A | * | 8/1908 | Stephenson ...................... 460/81 |
| 3,215,145 | A | * | 11/1965 | Zmuda .......................... 460/113 |
| 3,589,111 | A | * | 6/1971 | Gullickson et al. ............ 56/12.8 |
| 3,946,746 | A | * | 3/1976 | Decoene et al. ................ 460/73 |
| 4,305,407 | A | * | 12/1981 | De Coene ...................... 460/107 |
| 4,330,000 | A | * | 5/1982 | Peiler ............................ 460/109 |
| 4,440,179 | A | * | 4/1984 | Bassett et al. ................. 460/105 |
| 5,190,497 | A | * | 3/1993 | Heidjann ........................ 460/76 |
| 5,395,287 | A | * | 3/1995 | Coers ............................ 460/113 |
| 5,743,795 | A | | 4/1998 | Kersting |
| 6,358,142 | B1 | * | 3/2002 | Imel et al. ..................... 460/109 |
| 6,398,639 | B1 | * | 6/2002 | Dammann et al. ............ 460/107 |
| 6,958,012 | B2 | * | 10/2005 | Duquesne et al. .............. 460/76 |
| 7,137,882 | B2 | * | 11/2006 | Holtmann et al. .............. 460/75 |

FOREIGN PATENT DOCUMENTS

EP    0 745 317    12/1996

* cited by examiner

*Primary Examiner* — Árpád Fábián-Kovács
(74) *Attorney, Agent, or Firm* — Michael J. Striker

(57) ABSTRACT

A threshing mechanism is formed with a first threshing drum and a second threshing drum disposed one behind the other in a direction of crop flow. A first concave encloses the first threshing drum and the second threshing drum in sections in a circumferential direction. A second concave encloses the second threshing drum in sections in the circumferential direction. The concaves are displaceable in a radial direction of the threshing drums and are formed with at least one crop-processing device disposed at the first concave. The first concave and the second concave are swivellable about a common axis connecting the concaves. The enclosure of the second threshing drum by the first concave and the second concave is approximately identical.

14 Claims, 5 Drawing Sheets

THRESHING MECHANISM WITH SWIVELLABLE CONCAVES

CROSS-REFERENCE TO A RELATED APPLICATION

The invention described and claimed hereinbelow is also described in German Priority Document DE 10 2013 100057.6, filed on Jan. 4, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a threshing mechanism comprising first and second threshing drums disposed one behind the other, a first concave enclosing the first threshing drum and the second threshing drum in sections in the circumferential direction and, a second concave enclosing the second threshing drum in sections in the circumferential direction. The concaves are displaceable in the radial direction of the threshing drums and at least one crop-processing device is disposed at the first concave.

A threshing mechanism of the initially described type is known from EP 0 745 317 A1. EP 0 745 317 A1 describes a threshing mechanism that operates according to the principle of tangential flow and comprises at least two threshing drums disposed one behind the other and are driven in the same direction, with concaves assigned thereto. The first concave, which encloses the first threshing drum, is angled in the region thereof facing the second threshing drum and, there, comprises a crop-processing device designed as a friction or threshing element and is displaceably supported in the frame of the first concave. The concaves can be adjusted by a lever arrangement in the radial direction of the threshing drums, thereby changing the concave gap in order to permit adaptation to different types of crops to be processed. While the first concave is displaceable parallel to itself, the second concave is rotatably supported at the end thereof facing away from the first concave. As a result, when the distance of the two concaves from the first and the second threshing drum is jointly adjusted, the respective inlet gap at the first and the second threshing drum is changed in the same direction.

By contrast, the gap profile between the second threshing drum and the first concave, which wraps around this second threshing drum in sections, and the second concave is characterized by an increasingly convex profile as the concave separation is adjusted with increasing separation from the thrashing drums. This means that the gap profile from the inlet gap between the first concave and the second threshing drum to the outlet gap between the second concave and the second threshing drum follows a non-uniform, bulged course. This arrangement has an unfavorable effect on the crop flow and the quality of the threshing process.

SUMMARY OF THE INVENTION

The present invention overcomes the shortcomings of known arts, such as those mentioned above.

To that end, the present invention provides a threshing mechanism of the initially mentioned type characterized by higher threshing quality and improved crop flow for different crop types.

In one embodiment, the invention provides a threshing mechanism comprising a first threshing drum and a second threshing drum disposed one behind the other, a first concave enclosing the first threshing drum and the second threshing drum in sections in the circumferential direction and a second concave enclosing the second threshing drum in sections in the circumferential direction. The concaves are displaceable in the radial direction of the threshing drums and comprise at least one crop-processing device disposed at the first concave.

The first concave and the second concave are swivellable about a common axis connecting the concaves and the enclosure of the second threshing drum by the first concave and the second concave is approximately identical. Due to this enclosure of the second threshing drum by the first concave, which is markedly enlarged relative to the prior art, and due to the common axis, about which the concaves are swivellable, a substantially uniform concave gap profile across the entire adjustment spectrum of the concave separation is achieved. The effect resulting from the prior art, namely that the gap profile, proceeding from a narrow inlet gap, expands in the circumferential direction as the separation of concaves and threshing drums relative to one another increases and then tapers and leads into a narrow outlet gap, is prevented by the aforementioned embodiment of the first concave and the second concave.

Advantageously, at least the first concave comprises a frame in which at least two concave segments are disposed in the circumferential direction and which are at least partially replaceable. This segmentation of the first concave has the advantage that different combinations of the design of the concaves in the enclosing direction, of the second threshing drum in particular, may be implemented in a very simple manner. For example, a concave segment can be used in the inlet region of the second threshing drum that has perforations in the first concave that are finer than in the outlet region formed by the second concave.

According to another possible variation of the concave types used, a concave segment having round bars is used, for example, in the inlet region of the second threshing drum, which is enclosed by the first concave, while a concave segment having grates is provided in the downstream region, which is enclosed by the second concave. This arrangement also is reversible. Limiting the replaceability of concave segments would have the advantage that only one of two variants of the second concave, namely one having round bars and one having grates, can be fixedly mounted on the frame, while the remaining concave segments can be adapted, depending on customer requirements, by making a replacement on the first concave.

Advantageously, it is possible for the concave segments to be liftable in the radial direction relative to the frame of the first concave and to then be movable in the axial direction. As a result, the concave segments are easily replaced, since these concave segments are inserted into the frame. This removability of the concave segments makes it possible for the wall of the frame to have a continuous height, in contrast to frames known from the prior art, thereby increasing the dimensional stability of this frame per se. The frame also remains in the position thereof underneath the first and the second threshing drum, thereby making it possible to achieve greater stability of the threshing mechanism relative to a variant in which the entire concave can be withdrawn laterally out of the harvesting machine. A weight reduction of the concave segments compared to previous concave segments also can be achieved, since the basic robustness of the threshing mechanism is retained by the concave frame remaining in the harvesting machine.

Preferably, at least two replaceable concave segments are disposed next to one another in the axial direction of the first concave. Handling is thereby simplified when the concave segments are replaced, in that these concave segments can be designed smaller in size and therefore having less weight.

In order to simplify the replaceability of the concave segments, slide rails are disposed on the frame of the first concave, which permit the concave segment to be guided in the axial direction upon sliding in or pulling out.

In addition, groove-shaped recesses are disposed, offset relative to one another, in the frame of the first concave and in the concave segments accommodated therein. These groove-shaped recesses permit access by a suitable tool. As a result, a concave segment can be lifted in the radial direction relative to the frame of the first concave in order to then remove this concave segment, in the axial direction, from the first concave.

The replaceable concave segments are preferably affixed on one side. To this end, bolts can be disposed on one side of the frame, onto which the concave segment can be slid in order to be radially affixed, while through-holes are disposed on the opposite side of the frame, which enable the concave segment to be affixed relative to the frame, by screwing.

Moreover, the first concave comprises two sections shaped as circular arcs. The circular arcs are disposed such that they are angled with respect to one another and form a wedge-shaped transition region between the sections. This transition region extends in the radial direction between the first and the second threshing drum and is used to influence the threshing process.

To this end, the at least one crop-processing device is designed as filler plates, which can be inserted underneath the first concave, upstream of the transition region. Filler plates are used when the crop is a type of grain, in the case of which friction must be generated across a relatively narrow concave position in which the awns are removed by friction (as is the case with barley, for example). The process of disawning is generated substantially by the frictional effect in the straw mat between the concave and the threshing drum. The frictional effect, however, is substantially influenced by the concave gap or the rotational speed of the threshing drum.

Furthermore, the at least one crop-processing device is designed as filler plates, which can be additionally inserted downstream of the transition region in the circular arc-shaped section underneath the first concave. Due to the flexible expandability made possible by the installation of additional filler plates in the inlet region of the second threshing drum, multi-stage disawning can be achieved as necessary. The above-described simplified handling of the replaceable concave segments is enhanced in that the filler plates are installed in this region of the first concave, since the additional filler plates can be installed in the frame when the concave segments are in the de-installed state.

The filler plates are disposed in a manner swivellable about a pivot point; thereby enabling these filler plates to hang freely downward. Therefore, this concave section is open, or these filler plates are swivellable in the direction of the threshing drum and can be fastened on the frame by locking means thereby enabling this concave section to be closed by the installed filler plates and form a further disawning stage. The length of each of the installed filler plates can vary depending on the crop.

In addition, the at least one crop-processing device is designed as a grate, which is disposed in the transition region, axially parallel to the threshing drum and is swivellable about a pivot axis. The grate extends across the width of the threshing drums, can be actuated upstream of the inlet side of the concave and is equipped with projections, at least in sections, in the region thereof that interact with the second threshing drum. As such, the position of the grate can be changed in order to account for the type of crop to be processed, in that the grate, which can be actuated upstream of the concave inlet, is brought into or out of an operative position.

The grate can comprise a closed main body having a substantially U-shaped profile. The outer wall of the U-shaped section of the main body is designed smooth, thereby permitting the grate to be moved into a position in which this grate does not act on the crop, but rather merely serves to guide the crop.

Preferably, the grate comprises, on the circumference thereof, at least one element that extends across the width of the grate and protrudes beyond the main body in the radial direction. The grate can therefore be moved into a position in which the element acts on the crop. In particular, the element closing the main body can be designed as a plate, which is disposed perpendicularly to the legs and terminates flush with at least one of the legs.

In addition, the section of the plate extending between the legs can be equipped with projections distributed across the width of the grate, stand vertically on the plate and are designed in the shape of circular arcs.

The specific embodiment and arrangement of the plate on the main body makes it possible to position the grate such that the crop-processing device does not act on the crop when in a first position. In a second position of the crop-processing device, the grate is swivelled so far that the smooth leg forms a typo of ramp and, therefore the gap width between the second section of the first concave and the second threshing drum decreases, wherein the gap width between the concaves and the threshing drums remains unchanged. Such construction or arrangement results in a more aggressive threshing behavior. In a third position of the crop-processing device designed as a grate, the circular arc-shaped projections act on the crop making it possible to obtain a markedly more aggressive behavior during disawning.

Advantageously, the first concave and the second concave comprise straps, via which the first concave and the second concave are connected in an articulated manner to angular levers, each of which being swivellable about a fixed axis. These preferably hydraulically actuatable kinematics act simultaneously on these three axes, one of which is disposed in the inlet region of the first concave and one of which is disposed in the inlet region of the second concave, while the third axis is located in the outlet region of the second concave. Due to these kinematics, upon displacement of the second concave, the gap width in the inlet region of the second concave is varied and, simultaneously, the inlet region of the first concave is varied.

In particular, the crop processing devices are actuated independently of one another. It is therefore possible to implement multi-stage disawning as necessary, in that the crop-processing devices designed as filler plates and the crop-processing device designed as a grate are selectively moved into a position in which these can act on the crop stream.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
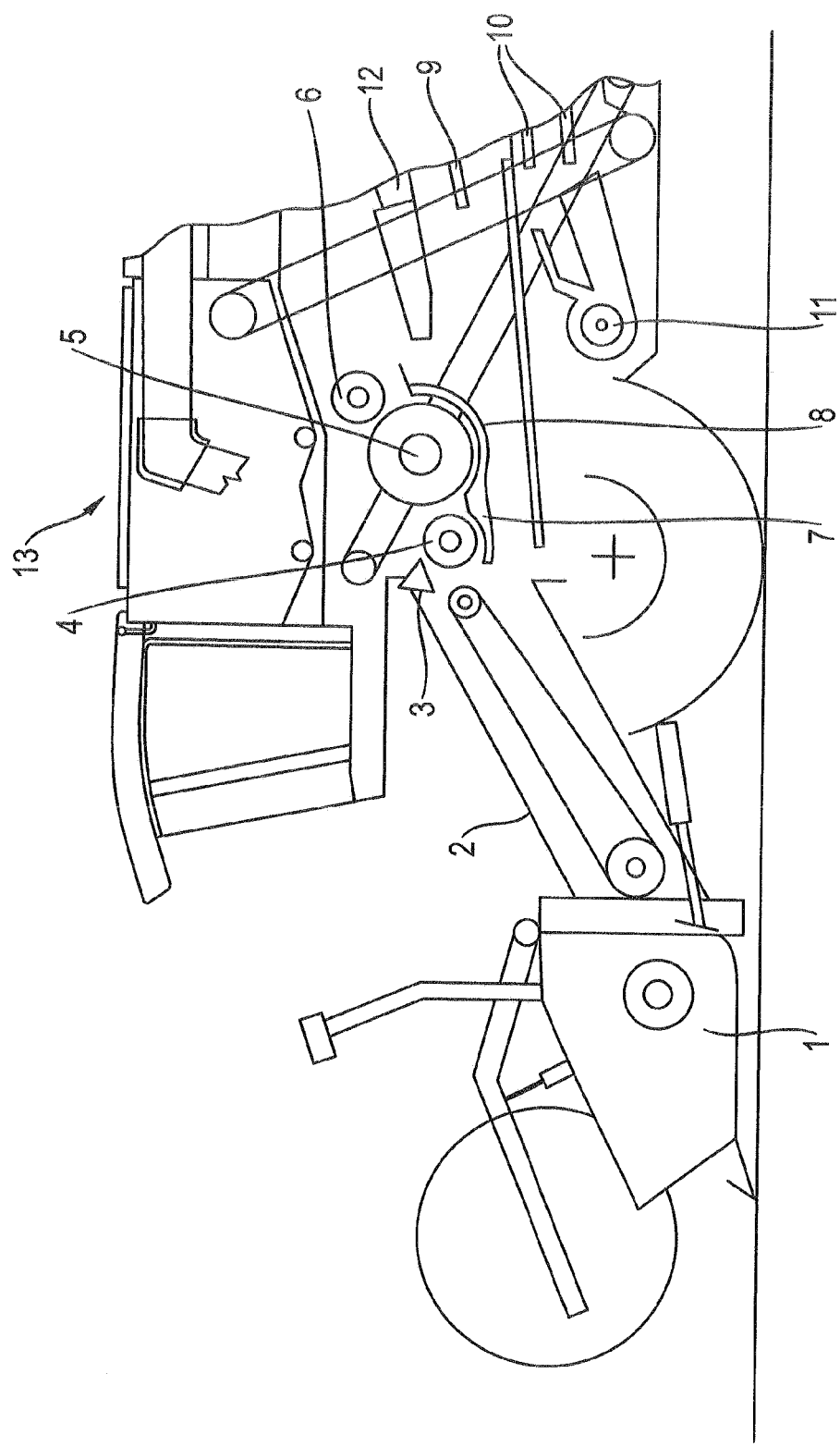
FIG. 1 presents a schematic partial view of a combine harvester.

FIG. 1 presents, in a schematic depiction, a partial view of a self-propelled combine harvester 13. Combine harvester 13 is equipped, in the front region thereof, with a header 1 comprising a reel and a feed rake 2 adjoining this header. In the harvesting operation, the crop lying on the field, which can be grain or another stalked crop, is cut by a cutting mechanism disposed within the header 1 and is fed to the feed rake 2 by a non-illustrated header auger. The feed rake 2, which can comprise chains equipped with conveyor slats, transports the crop into a threshing mechanism 3.

As shown in FIG. 1, the threshing mechanism 3 comprises a total of three drums, namely a pre-acceleration drum 4, a threshing drum 5, and a straw impeller 6. The pre-acceleration drum 4 interacts with a first threshing and separating grate 7, which encloses the pre-acceleration drum 4 around a portion of the circumference thereof. This first threshing and separating grate 7 is adjoined, in the direction of conveyance of the crop, by a second threshing and separating grate 8, which encloses the threshing drum 5 around a portion of the circumference thereof. A grain pan 9 extends underneath this arrangement, which is formed of the first and the second threshing and separating grate 7, 8. This grain pan can be brought into oscillation and conveys kernels, which have been threshed out of the crop by a washboard-type surface, to sieves 10, wherein any portions of short straw, awns, husks, etc., combined with the kernels are removed by means of a blower 11. The straw impeller 6 is followed, in the direction of flow of the stalked crop, by a post-separation device formed of a plurality of tray-type shakers 12, by which the remaining kernels are separated from the straw.

The design of the threshing mechanism 3 shall be explained in the following by reference to FIG. 2. The depiction shows a schematic side view of the threshing mechanism 3, wherein, for reasons of simplicity, only the first threshing drum 4, that is, the pre-acceleration drum, the second threshing drum 5, in addition to the associated concaves 7 and 8, are shown. The first concave 7, which encloses the first threshing drum 4 in sections, comprises a concave frame 14 formed of two concave cheeks. The two concave cheeks are disposed parallel to one another and each have two circular arc-shaped sections 14a, 14b. The circular arc-shaped sections 14a, 14b are disposed such that these are angled with respect to one another and form a wedge-shaped transition region 15 between the sections 14a, 14b.

The transition region 15 extends in the radial direction between the first threshing drum 4 and the second threshing drum 5, and extends across the axial expansion thereof. The second section 14b of the first concave frame 14 also encloses the second threshing drum 5 in sections. A second concave frame 16, which encloses the second threshing drum 5 in sections, adjoins the second section 14b of the first concave frame 14. The second section 14b of the first concave frame 14 and the second concave frame 16 are interconnected by a pivot axis 17b. The term "enclosure" in the sense of the description refers to the circular arc, which extends between the beginning and the end of the first concave 7, which encloses the first threshing drum 4, and between the beginning and the end of the second concave 8, which encloses the second threshing drum 5.

Further pivot axes 17a, 17c are located in the inlet region of the first threshing drum 4 and the second threshing drum 5, and in the outlet region of the second threshing drum 5. A lever arrangement 24 is provided underneath the first concave 7 and the second concave 8, and is used to adjust the distance between the concaves 7, 8 and the threshing drums 4, 5. The first concave 7 and the second concave 8 comprise straps 20a, 20b, 20c, by which the first concave 7 and the second concave 8 are connected in an articulated manner to angular levers 21a, 21b, 21c, each of which is swivellable about one of the fixed axes 18, 19, 22. The straps 20a, 20b, 20c and the angular levers 21a, 21b, 21c are disposed underneath the concave frame 14, 16.

A central hydraulic adjusting cylinder 23, which comprises a bladder accumulator, is disposed in a region downstream of the second threshing drum 5. The adjusting cylinder 23 is operatively connected to the angular levers 21a, 21b, 21c by coupling rods 24a, 24b and is used to adjust the gap width of the threshing mechanism 3. A control lever 25 is disposed upstream of the first threshing drum 4, which can be actuated by an operator from the outside of the combine harvester. The control lever 25 is used to actuate so-called filler plates 34, which are disposed underneath the first section 14a of the first concave 7, in that these filler plates are swivelled inward or outward, as is explained further below by reference to FIGS. 3 and 4.

The radial distance between the concaves 7, 8 and the threshing drums 4, 5, i.e., the gap width, must be set depending on the crop type. For example, the radial distance between the threshing drums and the concaves to be set increases from the processing of wheat up to corn. In order to prevent the effect known from the prior art, namely that the profile of the gap width follows a non-uniform, bulged course from the inlet gap between the first concave 7 and the second threshing drum 5 to the outlet gap between the second concave 8 and the second threshing drum 5, which has an unfavorable effect on the crop flow and the quality of the threshing process, the enclosure of the second threshing drum 5 by the first concave 7 and the second concave 8 is approximately identical.

The first concave 7 and the second concave 8 are interconnected by the pivot axis 17b, to which the strap 20b and, by means thereof, the angular lever 21b also are connected in an articulated manner. When the profile of the gap width is adjusted, in order to adapt to another crop type, by acting upon the lever arrangement 24 by the hydraulic cylinder 23, a substantially uniform distance sets in across the entire section of the second threshing drum 5, which is enclosed by the first concave 7 and the second concave 8. The angular lever 21b, which is coupled to the pivot axis 17b by means of the strap 20b, causes the second section 14b of the first concave 7 and the second concave 8 to move -away from the second threshing drum 5 to the approximately same extent as the transition region 15 and the outlet region of the second concave 8.

Figure 2:
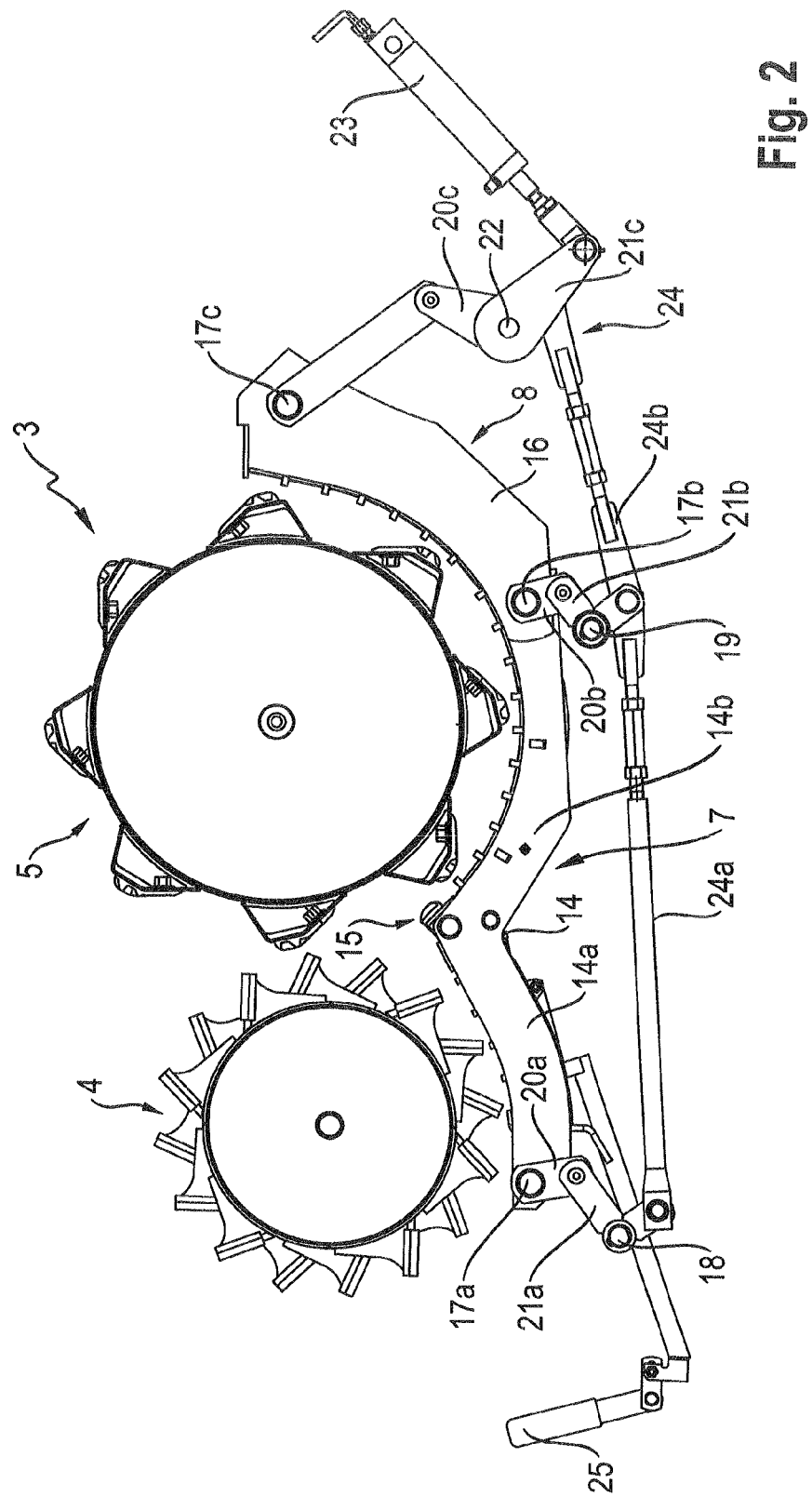
FIG. 2 presents a schematic side view of a threshing mechanism.
Figure 3:
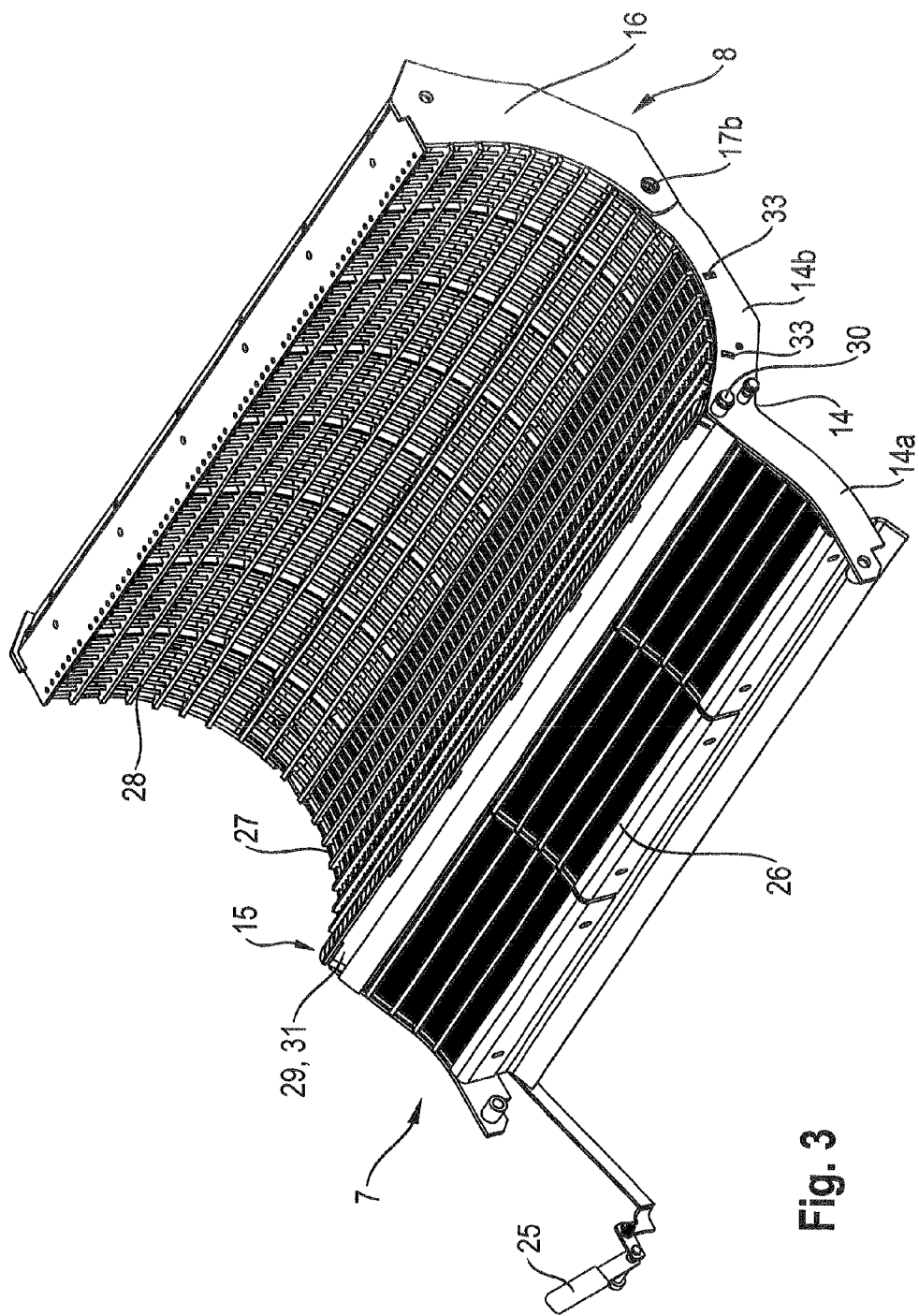
FIG. 3 presents a perspective view of the first and the second concave according to FIG. 2.

FIG. 3 shows a perspective depiction of the first concave 7 and the second concave 8 of the threshing mechanism 3 according to FIG. 2, from above. The first concave 7 and the second concave 8 comprise concave segments 26, 27, 28 disposed between the concave frames 14, 16. The concave segments 26, 27, 28 can each extend across the entire width of the threshing mechanism 3 or, as viewed in the direction of crop flow, can comprise a plurality of adjacently disposed concave segments, at least in sections. At least the concave segments 26 and 27 of the first concave 7 are detachably disposed between cheeks of the concave frame 14. As indicated in the depiction in FIG. 3, the concave segments 26, 27, 28 of the first concave 7 and the second concave 8 can have different designs. For example, the at least one concave segment 26 of the first concave 7, which encloses the first threshing drum 4 in sections, has a different perforation or means of opening than does the at least one concave segment 27, which encloses the second threshing drum 5 in sections.

The concave segment or segments 28 of the second concave 8, which enclose the second threshing drum 5 in sections, can also have a design that deviates from that of the first concave 7. The depiction in FIG. 3 furthermore shows a crop processing device 29, which is designed as a grate 31 and which is disposed axially parallel to the threshing drums 4, 5 in the wedge-shaped transition region 15. The crop processing device 29/grate 31 is swivellable about a pivot axis 30 and extends across the axial length of the threshing drums 4, 5. The grate 31 comprises a closed main body 36 having a substantially U-shaped profile, as shown in detail in FIG. 6.

Figure 4:
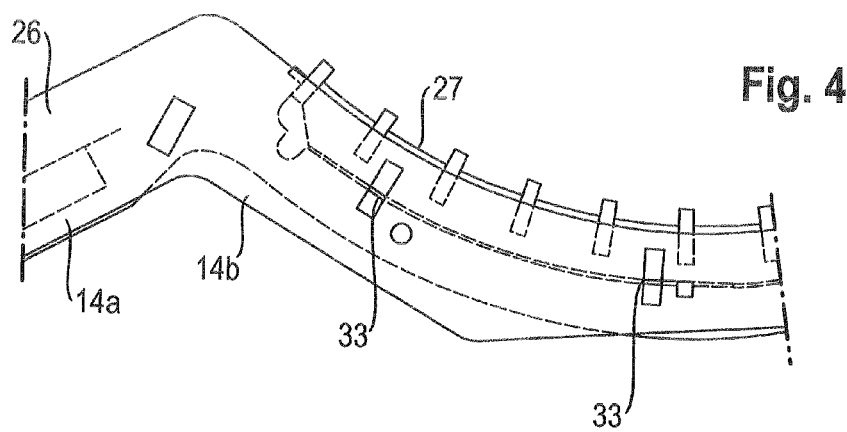
FIG. 4 presents an enlarged partial view of the first concave according to FIG. 3.

FIG. 4 shows an enlarged partial view of the first concave 7 according to FIG. 3, by reference to which a brief explanation shall be provided as to how the individual concave segments 26, 27 of the first concave 7 can be removed therefrom. To this end, the concave frame 14 is depicted partially using dashed lines in order to reveal further details. Slide rails, which extend between the sections 14a, 14b of the concave frame 14, are used to guide the particular concave segment 27 upon placement thereof into the first concave 7. In order to simplify removal of the concave segments 27, the second sections 14b of the concave frame 14 comprise recesses 33, into each of which a lever is inserted from the outside in order to lift the particular concave segment 27. The at least one concave segment 27 is removed by lifting the concave segment 27 in the radial direction and then removing same in the axial direction of the first concave 7.

Figure 5:
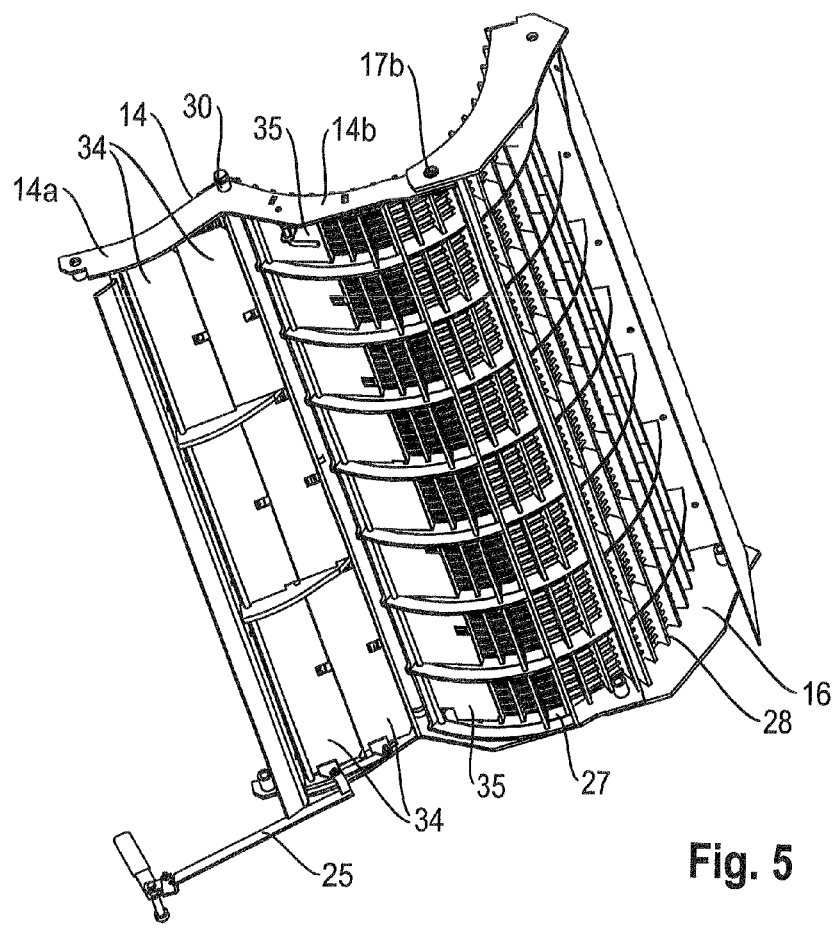
FIG. 5 presents a perspective view of the first and the second concave according to FIG. 3, from below.

The depiction in FIG. 5 shows a perspective view of the first concave 7 and the second concave 8 according to FIG. 3, from below. So-called filler plates 34 are mounted underneath the first section 14a, which is moved from a position in which these hang vertically downward, in which the filler plates 34 do not affect the crop stream, into a position bearing against the at least one concave segment 27, in which these filler plates close the first section 14a, as is shown. The filler plates 34 are manually actuated by the control lever 25. In a similar manner, filler plates 35 also can be mounted directly downstream of the transition region 15 in the second section of the first concave 7, wherein these filler plates are actuated in the same manner.

Figure 6:
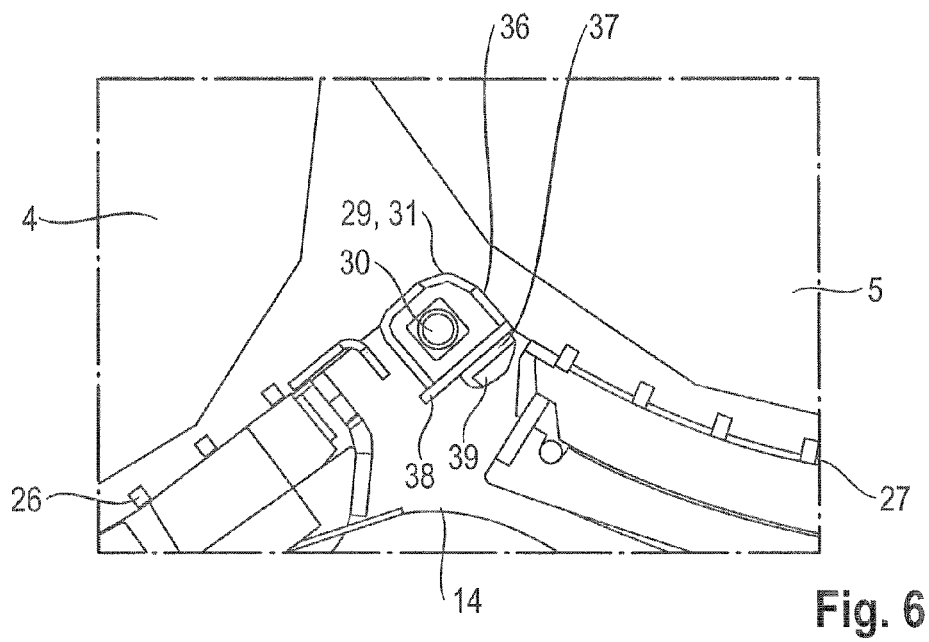
FIG. 6 presents a detailed view of a transition region according to FIG. 2.

FIG. 6 shows a detailed view of the transition region 15 according to FIG. 2, wherein the crop processing device 29 is shown in a sectional view. The grate 31 comprises a closed main body 36 having a substantially U-shaped profile and is swivellable about the pivot axis 30. The grate 31 comprises, on the circumference thereof, at least one element 37, which extends across the width of the grate 31 and extends beyond the main body 36 in the radial direction. The U-shaped main body 36 is closed by a plate 38, which is disposed perpendicularly to the legs of the main body 36 and protrudes beyond same on one side. The element 37, which is fastened on the plate 38, comprises projections 39, which stand vertically on the plate 38 and are designed in the shape of circular arcs.

In the position of the grate 31 shown FIG. 6, the element 37 is located outside of and underneath the plane of crop flow and therefore does not affect the crop. In this position of the grate 31, the crop is guided over the smooth surfaces of the main body 36. By rotating the grate 31 about the pivot axis 30, the grate 31 is moved into a position in which one leg of the main body 36 extends partially into the crop stream and thereby forms a type of ramp. The gap distance between the first concave 7 and the second threshing drum 5 in the transition region 15 can therefore be reduced such that the threshing behavior is thereby made more aggressive. Rotating the grate 31 further causes the element 37, with the projections 39 located thereon, to protrude into the crop stream. In this position of the grate 31, the plate 38, with the element 37 disposed thereon, faces the second threshing drum 5, which results in a further reduction of the gap distance and, therefore, an even more aggressive threshing behavior than the previously described position of the grate 31. The section of the plate 38 extending beyond the main body 36 also has the function, in this position of the crop processing device 29, of reducing the gap forming between the crop processing device 29 and the adjacent concave segment 27, in order to reduce passage of crop through this gap.

Due to the arrangement of the filler plates 34, 35 upstream and downstream of the transition region 15 (FIG. 5) and the arrangement of the crop processing device 29 in the transition region 15 between the filler plates 34, 35, a multi-stage disawning can be implemented as necessary. That is, the filler plates 34, 35 and the crop processing device 29 can be selectively moved, individually or jointly, into a position in which these can act on the crop stream.

Figure 7:
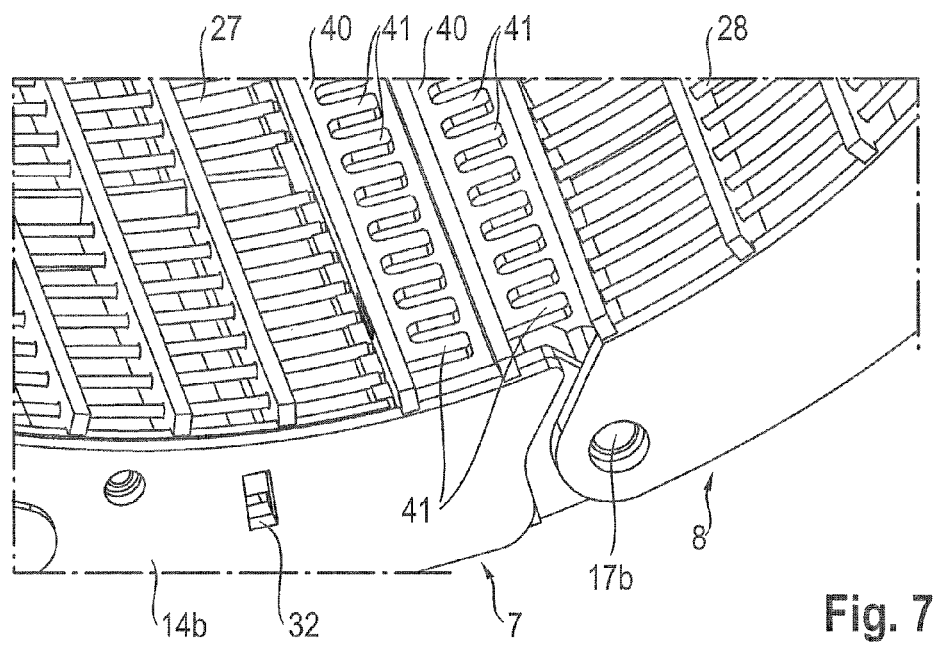
FIG. 7 presents a detailed view of the region between the first concave and the second concave according to FIG. 3.

FIG. 7 shows a detailed view of the region between the first Concave 7 and the second concave 8, in which these concaves are swivellable relative to one another about the pivot axis 17b. In order to enable both concaves 7, 8 to swivel relative to one another about the common pivot axis 17b, spatial separation must exist between the two concave segments 27 and 28 in this region. In order to minimize the portion of crop, in particular straw, that can pass between the concaves 7, 8 in this region and reach the grain pan 9, at least one rail 40 having finger-shaped crop-guiding elements 41 is disposed between the concaves 7, 8.

List of Reference Characters
1 header
2 feed rake
3 threshing mechanism
4 first threshing drum
5 second threshing drum
6 straw impeller
7 first concave
8 second concave
9 grain pan
10 cleaning sieve
11 cleaning fan
12 tray-type shaker
13 combine harvester
14 first concave frame
14a first section
14b second section
15 transition region 16 second concave frame
17a pivot axis
17b pivot axis
17c pivot axis
18 fixed axis
19 fixed axis
20a strap
20b strap
20c strap
21a angular lever
21b angular lever
21c angular lever
22 fixed axis
23 adjusting drum
24 lever arrangement
25 control lever
26 concave segment
27 concave segment
28 concave segment
29 crop processing device
30 pivot axis
31 grate
33 recess
34 filler plate
35 filler plate
36 main body
37 element
38 plate
39 projections
40 rail
41 crop-guiding element As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A threshing mechanism, comprising:
   a first threshing drum and a second threshing drum disposed one behind the other in a direction of crop flow;
   a first concave, having a first section and a second section, enclosing the first threshing drum by the first section and the second threshing drum by the second section in sections in a circumferential direction; and
   a second concave enclosing the second threshing drum in sections in a circumferential direction,
   wherein the concaves are displaceable in a radial direction of the threshing drums and comprise at least one crop-processing device disposed at the first concave;
   wherein the first concave and the second concave are swivellable about a common axis connecting the first and the second concaves; and
   wherein the enclosure of the second threshing drum by the second section of the first concave and the second concave is approximately identical.

2. The threshing mechanism according to claim 1, wherein at least the first concave comprises a concave frame in which at least two concave segments are each disposed in the circumferential direction.

3. The threshing mechanism according to claim 2, wherein the at least two concave segments are configured to move in the radial direction relative to the frame of the first concave and then to move in the axial direction to release the at least two concave segments.

4. The threshing mechanism according to claim 2, wherein the at least two concave segments are disposed next to one another in the axial direction of the first concave.

5. The threshing mechanism according to claim 2, wherein rails are disposed on the concave frame of the first concave.

6. The threshing mechanism according to claim 2, wherein groove-shaped recesses are disposed, offset relative to one another, in the concave frame of the first concave and in the concave segments accommodated therein.

7. The threshing mechanism according to claim 1, wherein the first concave comprises a first and a second circular arc-shaped section, which are angled with respect to one another and form a wedge-shaped transition region between the respective arc-shaped sections.

8. The threshing mechanism according to claim 7, wherein the at least one crop-processing device is designed as filler plates, which can be inserted underneath the first concave, upstream of the wedge-shaped transition region.

9. The threshing mechanism according to claim 7, wherein the at least one crop-processing device is designed as filler plates, which can be inserted downstream of the wedge-shaped transition region in the second section, underneath the first concave.

10. The threshing mechanism according to claim 7, wherein the at least one crop-processing device is designed as a grate that is disposed axially parallel to the threshing drums in the wedge-shaped transition region and wherein the grate is swivellable about a pivot axis and extends across an axial length of the threshing drums.

11. The threshing mechanism according to claim 10, wherein the grate comprises a closed main body having a substantially U-shaped profile.

12. The threshing mechanism according to claim 11, wherein the grate comprises, on the circumference thereof, at least one element extending across a width of the grate beyond the closed main body in the radial direction.

13. The threshing mechanism according to claim 1, wherein the first concave and the second concave comprise straps, wherein the first concave and the second concave are connected in an articulated manner to angular levers by the straps and wherein each of the straps is swivellable about a fixed axis.

14. The threshing mechanism according to claim 9, wherein the filler plates are actuatable by a control lever.

* * * * *